US006308149B1

(12) United States Patent
Gaussier et al.

(10) Patent No.: US 6,308,149 B1
(45) Date of Patent: Oct. 23, 2001

(54) GROUPING WORDS WITH EQUIVALENT SUBSTRINGS BY AUTOMATIC CLUSTERING BASED ON SUFFIX RELATIONSHIPS

(75) Inventors: Eric Gaussier, Grenoble; Gregory Grefenstette, Gieres; Jean-Pierre Chanod, Grenoble, all of (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/213,309

(22) Filed: Dec. 16, 1998

(51) Int. Cl.$^7$ .................................................. G06F 17/27
(52) U.S. Cl. ............................................................ 704/9
(58) Field of Search .................................. 704/1, 8, 9, 10; 707/530, 531, 532

(56) References Cited

U.S. PATENT DOCUMENTS

| | | | |
|---|---|---|---|
| 4,342,085 | | 7/1982 | Glickman et al. .................... 707/533 |
| 4,799,188 | | 1/1989 | Yoshimura ............................ 707/533 |
| 4,864,501 | | 9/1989 | Kucera et al. ............................ 704/9 |
| 5,099,425 | * | 3/1992 | Kanno Yuji et al. .................... 704/9 |
| 5,237,503 | * | 8/1993 | Bedecarrax et al. .................... 704/8 |
| 5,323,310 | * | 6/1994 | Robinson .................................. 704/2 |
| 5,442,778 | * | 8/1995 | Pedersen et al. ......................... 704/9 |
| 5,500,796 | * | 3/1996 | Black, Jr. ................................. 704/8 |
| 5,559,693 | * | 9/1996 | Anick et al. ............................. 704/8 |
| 5,594,641 | | 1/1997 | Kaplan et al. ............................ 704/9 |
| 5,625,554 | * | 4/1997 | Cutting et al. ........................... 704/1 |
| 5,708,829 | * | 1/1998 | Kadashevich et al. .................. 704/9 |
| 5,794,177 | * | 8/1998 | Carus et al. .............................. 704/9 |
| 5,835,888 | * | 11/1998 | Kanevsky et al. ..................... 704/10 |
| 5,911,140 | * | 6/1999 | Turkey et al. ............................ 707/5 |
| 5,924,105 | * | 7/1999 | Punch, III et al. ................... 707/513 |
| 5,940,624 | * | 8/1999 | Kadashevich et al. .................. 704/1 |

OTHER PUBLICATIONS

Author Unknown Suffix–Dependent Synonym Data Storage Technique, IBM Technical Disclosure Bulletin, vol. 26, No. 11, Apr. 1984, pp. 6092–6093.

Croft, W. B. Et Al. "Corpus–Specifc Stemming Using Word Form Co–Occurrence," In Proceedings for the Fourth Annual Symposium on Document Analysis and Information Retrieval, Las Vegas, Nevada; Apr. 1995, pp. 147–159.

Savoy, Jacques "Stemming of French Words Based on Grammatical Categories," Journal of the American Society for Information Science, vol. 44, No. 1, Jan. 1993, pp. 1–9, XP–000885013.

Adamson, George W. Et Al. "The Use of an Association Measure Based on Character Structure to Identify Semantically Related Pairs of Words and Document Titles," Inform. Stor. Retr. vol. 10, 1974, pp. 253–260.

Chanod, Jean–Pierre et al. "Taging French–Comparing a Statistical and a Constraint–Based Method," Rank Xerox Research Centre, pp. 149–156.

Dawson, J.L. "Suffix Remvoal and Word Conflation," ALLC Bulletin, 1974, pp. 33–46.

(List continued on next page.)

Primary Examiner—Patrick N. Edouard (57) ABSTRACT

A set of words of a natural language is grouped by automatically obtaining suffix relation data that indicate a relation value for each of a set of relationships between suffixes that occur in the natural language, and, then, by automatically clustering the words in the set using the relation values from the suffix relation data, to obtain group data indicating groups of words. Two or more words in a group have suffixes as in one of the relationships and, preceding the suffixes, equivalent substrings. The relationships can be pairwise relationships, and the relation value can indicate the number of occurrences of a suffix pair. The suffix relation data can be obtained using an inflectional lexicon. Complete link clustering can be used.

19 Claims, 7 Drawing Sheets

OTHER PUBLICATIONS

Frakes, W.B. "Stemming Algorithms," Information Retrieval Data Structures & Algorithms, Prentice Hall, New Jersey, 1992, pp. 131–160.

Frakes, W.B. "Term Conflation for Information Retrieval," Research and Development in Information Retrieval Proceedings of the third joint BCS and ACM symposium, King's College, Cambridge, Jul. 2–6, 1984, pp. 383–389.

Hafer, Margaret A. Et Al. "Word Segmentation by Letter Successor Varieties," Inform. Stor, Retr. vol. 10, pp. 371–385.

Harman, Donna "How Effective Is Suffixing?" Journal of the American Society for Information Science, Jan. 1991, vol. 42, No. 1, pp. 7–15.

Hull, David A. "Stemming Algorithms: A Case Study for Detailed Evaluation," Journal of the American Society for Information Science, Jan. 1996, vol. 47, No. 1, pp. 70–84.

Jacquemin, Christian "Guessing Morphology from Terms and Corpora," Proceedings of the 20$^{th}$ Annual International ACM SIGIR Conference on Research and Development in Information Retrieval, Philadelphia, Pennsylvania, Jul.27–31, 1997, pp. 156–165.

Karttunen, Lauri et al. "A Compiler for Two–Level Phonological Rules," Jun. 25, 1987.

Karttunen, Lauri "Constructing Lexical Transducers," Proceedings of the 15$^{th}$ International Conference on Computational Linguistics, Kyoto, Japan, Aug. 5–9, 1994, pp. 406–411.

Karttunen, Lauri "The Replace Operator," Proceedings of 33$^{rd}$ Annual Meeting of the Association for Computational Linguistics, ACL–94, Boston, Massachusetts, 1995, pp. 16–23.

Kaplan, Ronald M. et al. "Regular Models of Phonological Rule Systems," Computational Linguistics, vol. 20, No. 3, 1994, pp. 331–380.

Lennon, Martin Et Al. "An Evaluation of Some Conflation Algorithms for Information Retrieval," Journal of Information Science 3, 1981, pp. 177–183.

Lovins, Julie Beth "Development of a Stemming Algorithm*," Mechanical Translation and Computational Linguistics, vol. 11, 1968, pp. 22–31.

Paice, Chris D. "Another Stemmer," SIGIR Forum, Fall 1990, vol. 24, No. 3, pp. 56–61.

Paice, Chris D. "Method for Evaluation of Stemming Algorithms Based on Error Counting," Journal of the American Society for Information Science, vol. 47, No. 8, Aug. 1996, pp. 632–649.

Porter, M.F. "An Algorithm for Suffix Stripping," Program, vol. 14, No. 3, Jul. 1980, pp. 130–137.

Rasmussen, Edie "Clustering Algorithms," pp. 419–436.

Roche, Emmanuel et al. "Deterministic Part–of–Speech Tagging with Finite–State Transducers," Computational Linguistics, vol. 21, No. 2, 1995, pp. 227–253.

Romesburg, H. Charles Cluster Analysis for Researchers, 1984, pp. 9–15.

Salton, Gerard et al. Introduction to Modern Information Retrieval, McGraw–Hill Book Company, 1983, pp. 130–136.

"Xerox Linguistic Database Reference English Version 1.1.4," Xerox Corporation, 1994.

* cited by examiner

GROUPING WORDS WITH EQUIVALENT SUBSTRINGS BY AUTOMATIC CLUSTERING BASED ON SUFFIX RELATIONSHIPS

FIELD OF THE INVENTION

The invention relates to grouping words, some of which include equivalent substrings.

BACKGROUND AND SUMMARY OF THE INVENTION

Some conventional techniques group related words using some type of manual choice. For example, Debili, F., *Analyse Syntaxico-Semantique Fondee Sur Une Acquisition Automatique de Relations Lexicales-Semantiques*, Doctoral Thesis, Univ. Paris XI, Jan. 26, 1982, pp. 174–223, discloses such a technique to obtain families of words. The Debili thesis discloses that each word is truncated by removing suffixes (and possibly prefixes) to obtain a stem ("radical"). Binary correlation matrices of suffixes are created by examining an automatically produced correlation matrix of suffixes and manually produced compatibility and incompatibility matrices of suffixes, and are corrected by inserting a zero for suffixes that are not compatible. The suffix matrices and the stems can then be used to automatically obtain families of words, with certain manual corrections.

In contrast, other conventional techniques automatically group words without manual intervention. Adamson, G., and Boreham, J., "The use of an Association Measure Based on Character Structure to Identify Semantically Related Pairs of Words and Document Titles", *Information Storage and Retrieval*, Vol. 10, 1974, pp. 253–260, disclose such an automatic word classification technique based on comparison of pairs of consecutive characters, called digrams. The technique computes a similarity coefficient between pairs of words based on the number of digrams common to the words and on the sum of the total numbers of digrams in the words, to obtain a matrix of similarity coefficients for all pairs of words. The matrix is then used to cluster the words by the method of single linkage, to produce a numerically stratified hierarchy of clusters.

Lennon, M., Peirce, D.S., Tarry, B.D., and Willett, P., "An evaluation of some conflation algorithms for information retrieval", *Journal of Information Science*, Vol. 3, 1981, pp. 177–183, describe stemming algorithms that reduce all words with the same root to a single form by stripping each word of its derivational and inflectional affixes. If prefixes are not removed, the procedure conflates all words with the same stem. Lennon et al. describe an evaluation to determine whether the reduction in implementation costs for machine processing algorithms is achieved at the expense of a decrease in conflation performance, when compared to algorithms based on manual evaluation of possible suffixes. They conclude that there is relatively little difference despite the different ways algorithms are developed, and that simple, fully automated methods perform as well for English language information retrieval as procedures which involve a large degree of manual involvement in their development.

The invention addresses a basic problem that arises in grouping related words. Conventional techniques exhibit a tension between accuracy and speed: Manual techniques can be used to group words very accurately, but are complex and tedious. Automatic techniques, on the other hand, can be very fast, but produce groupings that are not as generally accurate as can be obtained manually.

The invention is based on the discovery of a new automatic technique for grouping words that alleviates the tension between accuracy and speed. The new technique automatically obtains suffix relation data indicating a relation value for each of a set of relationships between suffixes that occur in a natural language; the relation value for a relationship could, for example, be its frequency of occurrence in a set of words from the natural language. The new technique then performs automatic clustering of a set of words using the relation values from the suffix relation data, to obtain groups of words, where two or more words in a group have suffixes as in one of the relationships and, preceding the suffixes, equivalent substrings.

The new technique can be implemented for pairwise relationships between suffixes, with the relation value of each suffix pair being the number of pairs of words that are related to each other by the pair of suffixes. Automatic clustering can then be performed with the pairwise similarity between words being the greatest relation value of the suffix pairs, if any, that relate the words to each other. Complete link clustering can be used. The new technique can be implemented using a lexicon, such as an inflectional lexicon, to automatically obtain a word list and then to use the word list in automatically obtaining suffix pair data. The suffix pair data can indicate pairs of suffixes that relate words to each other and, for each pair of suffixes, a relation value indicating a number of times the suffix pair occurs in the word list. The suffix pair data can further indicate, for each suffix in a pair, a part of speech, and the relation value can accordingly indicate the number of times the suffixes in the suffix pair occur in the word list with the indicated parts of speech.

A representative for each group of words indicated by the group data can also be automatically obtained, such as the shortest word in the group. Further, a data structure, such as a finite state transducer (FST), can be automatically produced that can be accessed with a word in a group to obtain the group's representative. The data structure can also be accessed with a group's representative to obtain a list of the words in the group.

The new technique can further be implemented in a system that includes memory and a processor that automatically obtains the suffix relation data and automatically clusters the set of words to obtain the group data, storing the suffix is relation data and the group data in memory. The processor can also automatically produce a data structure as described above and provide it to a storage medium access device for storage on a storage medium or to another machine over a network.

In comparison with conventional techniques for grouping words with manual choice or other manual involvement, the new technique is advantageous because it is automatic and therefore can be performed quickly. In addition, with appropriate clustering techniques, the new technique can approach the accuracies obtainable with manual techniques.

In comparison with conventional automatic techniques for grouping words, the new technique is significantly more accurate. Indeed, when applied to the problem of stemming, the new technique is also more accurate than conventional semi-automatic stemmers that rely on a list of suffixes, a set of rules, and a list of exceptions.

The new technique is also advantageous because it can be readily applied to additional languages for which inflectional lexicons are available. A language's inflectional lexicon can be used to automatically obtain suffix pairs with relation values.

The new technique is also advantageous because it can be implemented to use complete words as group representatives. In comparison with techniques that use substrings to represent groups, this is advantageous because it avoids ambiguous representatives that could represent more than one group.

The following description, the drawings, and the claims further set forth these and other aspects, objects, features, and advantages of the invention.

DETAILED DESCRIPTION OF THE INVENTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values". For example, a binary item of data, also referred to as a "bit", has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processor" or "processor" is any component or system that can process data, and may include one or more central processing units or other processing components.

A processor performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

A processor "accesses" an item of data in memory by any operation that retrieves or modifies the item or information within the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item.

A processor accesses a first item of data "with" a second item of data if the processor uses the second item of data in accessing the first, such as by using the second item to obtain a location of the first item of data or to obtain information from within the first item of data.

To "obtain" or "produce" an item of data is to perform any combination of operations that begins without the item of data and that results in the item of data. To obtain a first item of data "based on" a second item of data is to use the second item to obtain the first item.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary.

A "natural language set" is a set of one or more natural languages.

"Character" means a discrete element that appears in a written, printed, or phonetically transcribed form of a natural language. Characters in the present day English language can thus include not only alphabetic and numeric elements, but also punctuation marks, diacritical marks, mathematical and logical symbols, and other elements used in written, printed, or phonetically transcribed English. More generally, characters can include, in addition to alphanumeric elements, phonetic, ideographic, or pictographic elements.

A "word" is a string of one or more elements, each of which is a character or a combination of characters, where the string is treated as a semantic unit in at least one natural language. A word "occurs" in each language in which it is treated as a semantic unit.

A "lexicon" is used herein to mean a data structure, program, object, or device that indicates a set of words that may occur in a natural language set. A lexicon may be said to "accept" a word it indicates, and those words may thus be called "acceptable" or may be referred to as "in" or "occurring in" the lexicon.

As used herein, an "inflectional lexicon" is a lexicon that, when accessed with a correctly inflected input word, provides access to a lemma or normalized dictionary-entry form of the input word. An inflectional lexicon typically includes one or more data structures and a lookup routine for using the input word to access the data structures and obtain the lemma or an output indicating the input word is unacceptable.

A "prefix" is a substring of characters occurring at the beginning of a word, and a "suffix" is a substring of characters occurring at the end of a word.

A suffix "follows" a substring in a word and the substring "precedes" the suffix if the last character of the substring immediately precedes the first character of the suffix.

A "relationship" between suffixes refers to the occurrence in a natural language set of a set of words that are related but that have different suffixes, which are thus "related suffixes". A "pairwise relationship" is a relationship between two suffixes. A relationship between suffixes "occurs" when a natural language set includes a set of related words, each of which has one of the suffixes. If a part of speech is also indicated for each suffix, the relationship only "occurs" if the related word that has a suffix also has the indicated part of speech.

Substrings that precede related suffixes in a set of different words are "equivalent" if the words are all related because of a relationship between the substrings. For example, it is conventional to make minor graphical changes in a substring that precedes a suffix during inflectional changes, such as by adding or deleting a diacritical mark or otherwise changing a character to indicate a change in pronunciation or by changing between a single character and a doubled character. Substrings that precede suffixes may also be equivalent because they are phonetic alternatives, because of a historical relationship through which one developed from the other or both developed from a common ancestor, because they are cognates in two different languages, or because of any of various other relationships.

The "frequency of occurrence" of a suffix relationship in a set of words is the number of different subsets of words in the set that are related by the suffix relationship.

A set of suffixes "relates" a set of words if each of the words can be obtained from any other in the set by a process that includes removing one of the suffixes and adding another of the suffixes. The process may also include other modifications, such as to a substring preceding the suffix or to a prefix that precedes the substring, but if there are no such other modifications, a prefix that includes the substring "occurs" with each of the suffixes in the set to form the set of related words.

A "clustering" is an operation that groups items based on similarity, association, or another such measure. To "cluster" is to perform a clustering.

A "pairwise similarity" is an item of data indicating a measure of similarity between two items.

A finite state transducer (FST) is a data processing system having a finite number of states and transitions (or arcs), each transition originating in a state and leading to a state, and in which each transition has associated values on more than one level. As a result, an FST can respond to an input signal indicating a value on one of the levels by following a transition with a matching value on the level and by providing as output the transition's associated value at another level. A two-level transducer, for example, can be used to map between input and output strings, and if the values are character types, the input and output strings can be words.

A "finite state transducer data structure" or "FST data structure" is a data structure containing information sufficient to define the states and transitions of an FST.

The term "word list" is used herein in the generic sense of a data structure that indicates a set of words. The data structure could, for example, be a finite state machine (FSM) data structure, an FST data structure, a list data structure, or any other appropriate type of data structure.

A "representative" of a group is an item of data that is unique to the group so that it can be used to represent the group. A representative may be one of the members of a group of items of data or it may be an item of data obtained in some other way.

B. General Features

Figure 1:
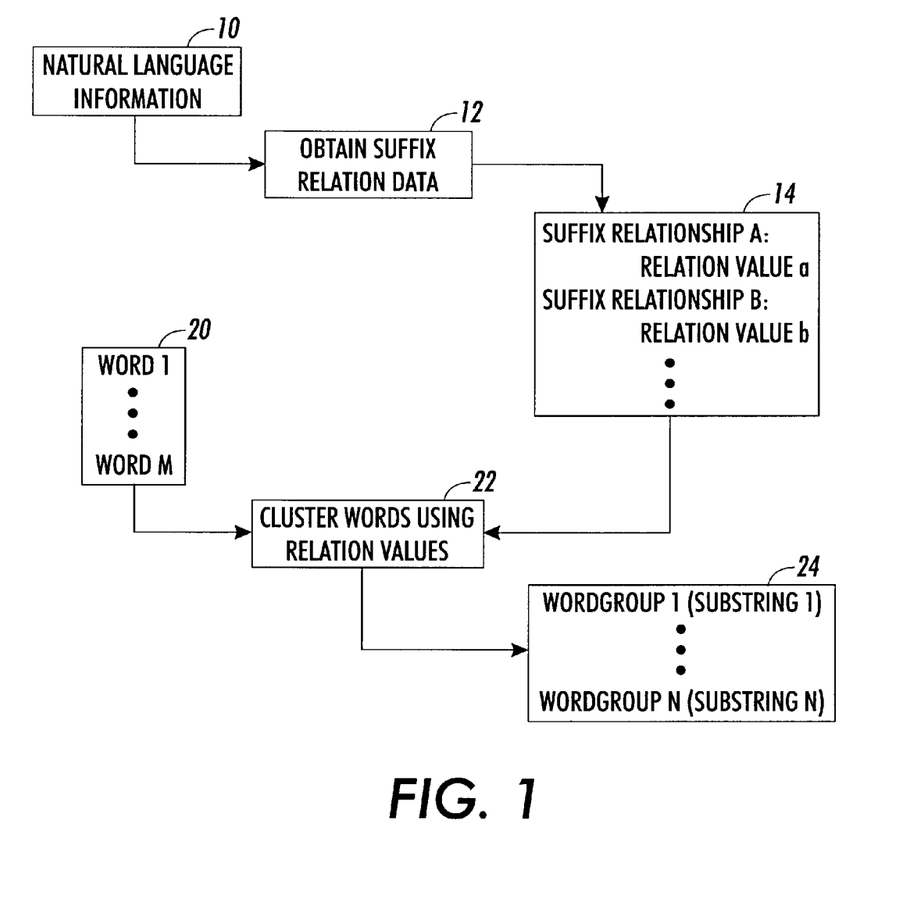
FIG. 1 is a schematic flow diagram showing how word groups can be obtained using suffix relation data.
Figure 2:
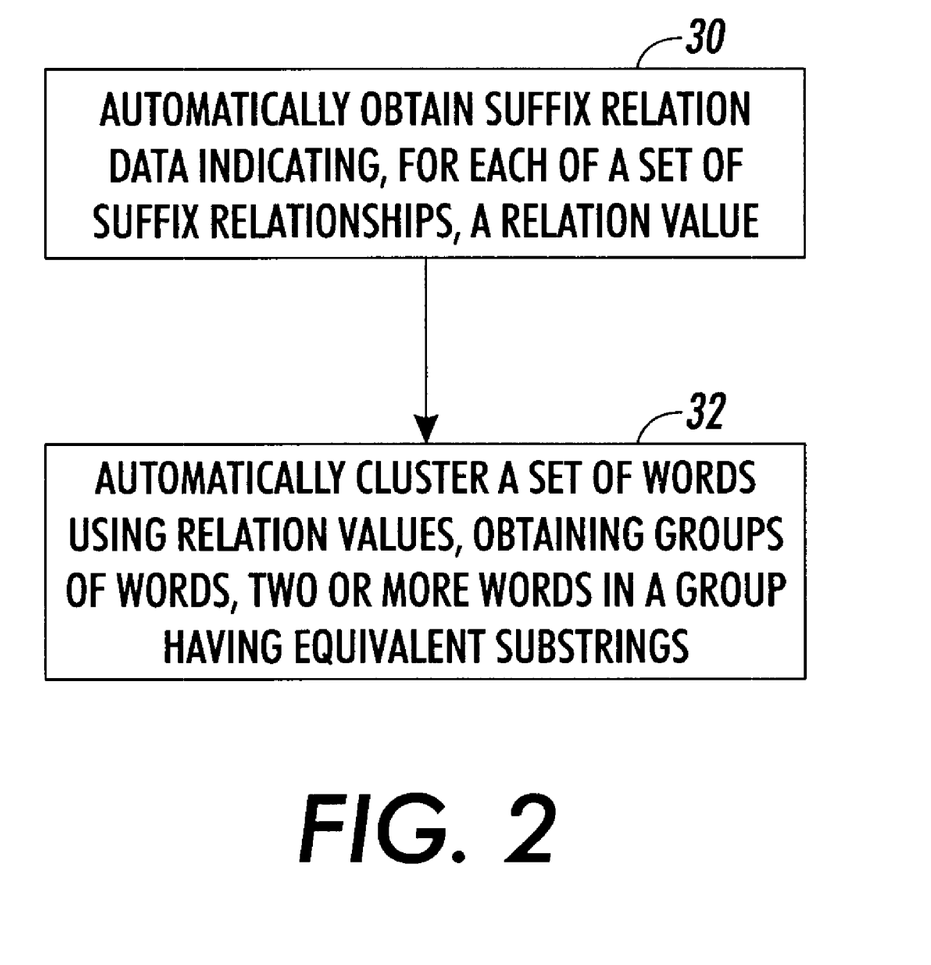
FIG. 2 is a flow chart showing general acts in obtaining word groups by automatically obtaining suffix relation data and by automatically clustering a set of words.
Figure 3:
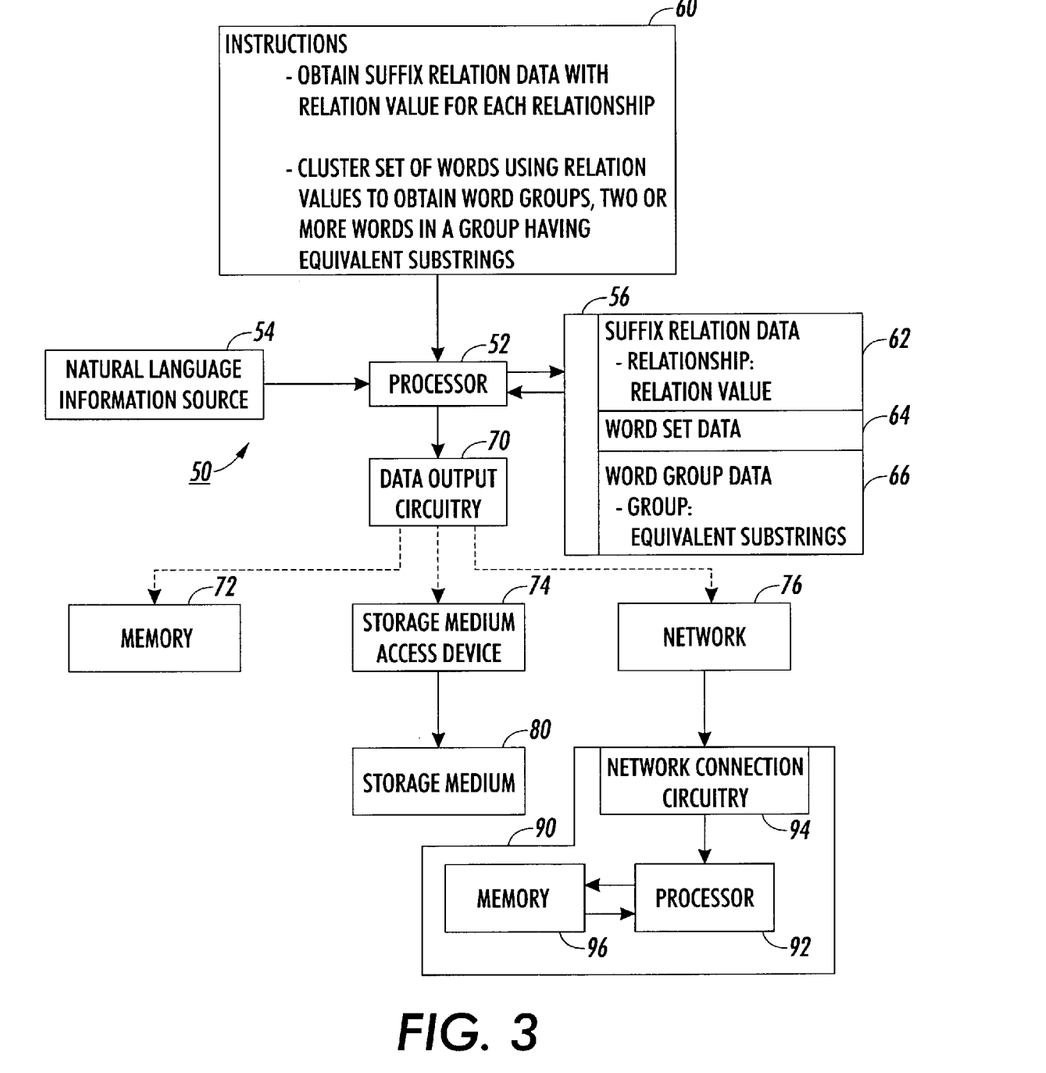
FIG. 3 is a schematic diagram showing components of a system that can perform the general acts in FIG. 2.

FIGS. 1–3 illustrate general features of the invention.

FIG. 1 is a flow diagram that shows schematically how word groups can be obtained. In FIG. 1, the boxes at left represent external input to word grouping, the boxes in the center represent operations performed during word grouping, and the boxes at right represent intermediate and final word grouping results.

The input in box 10 provides information about a natural language set from which the operation in box 12 can obtain suffix relation data, illustratively shown as an intermediate result in box 14. As shown, the suffix relation data include, for each suffix relationship, a relation value; suffix relations A and B illustratively have relation values a and b, respectively.

The suffix relation data in box 14 and a set of words, word1 through wordM as shown in box 20, can then be used by the operation in box 22, which clusters the words using the relation values to obtain group data indicating groups of the words (word group 1 through word group N), illustratively shown as a final result in box 24. As illustrated in box 24, a word group (illustratively word group 1) can include two or more words that have suffixes as in one of the relationships and, preceding the suffixes, equivalent substrings.

In box 30 in FIG. 2, a technique automatically obtains suffix relation data indicating a relation value for each of a set of relationships between suffixes that occur in a natural language set. Then, in box 32, the technique automatically clusters a set of words that may occur in the natural language set. Clustering in box 32 uses the relation values from the suffix relation data, and obtains group data indicating groups of words, where a group includes two or more words that have suffixes as in one of the relationships and, preceding the suffixes, equivalent substrings.

Machine 50 in FIG. 3 includes processor 52 connected for receiving information about a natural language from a source 54 and also connected for accessing data in memory 56 and for receiving instruction data 60 indicating instructions processor 52 can execute.

In executing the instructions indicated by instruction data 60, processor 52 obtains suffix relation data 62 which include, for each of a set of suffix relationships, a relation value. Processor 52 then clusters a set of words indicated by word set data 64 using relation values from suffix relation data 62 to obtain word group data 66, indicating groups of words, a group including two or more words that have suffixes as in one of the relationships and, preceding the suffixes, equivalent substrings.

FIG. 3 illustrates three possible destinations to which data output circuitry 70 could provide word group data 66—memory 72, storage medium access device 74, and network 76. In each case, word group data 66 could be provided separately or as part of a body of data that may also include instructions and other data that would be accessed by a processor in executing the instructions.

Memory 72 could be any conventional memory within machine 50, including random access memory (RAM) or read-only memory (ROM), or could be a peripheral or remote memory device of any kind.

Storage medium access device 74 could be a drive or other appropriate device or circuitry for accessing storage medium 80, which could, for example, be a magnetic medium such as a set of one or more tapes, diskettes, or floppy disks; an optical medium such as a set of one or more CD-ROMs; or any other appropriate medium for storing data. Storage medium 80 could be a part of machine 50, a part of a server or other peripheral or remote memory device, or a software product. In each of these cases, storage medium 80 is an article of manufacture that can be used in a machine.

Network 76 can provide word group data 66 to machine 90. Processor 52 in machine 50 can establish a connection with processor 92 over network 76 through data output circuitry 70 and network connection circuitry 94. Either processor could initiate the connection, and the connection could be established by any appropriate protocol. Then processor 52 can access word group data 66 stored in memory 56 and transfer the word group data 66 to processor 92 over network 76. Processor 92 can store word group data 66 in memory 94 or elsewhere, and can then access it to perform lookup.

C. Implementation

The general features described above could be implemented in numerous ways on various machines to obtain word groups. An implementation described below has been implemented on a Sun SPARC workstation running Sun OS and executing code compiled from C and Perl source code.

C.1. Overview

Figure 4:
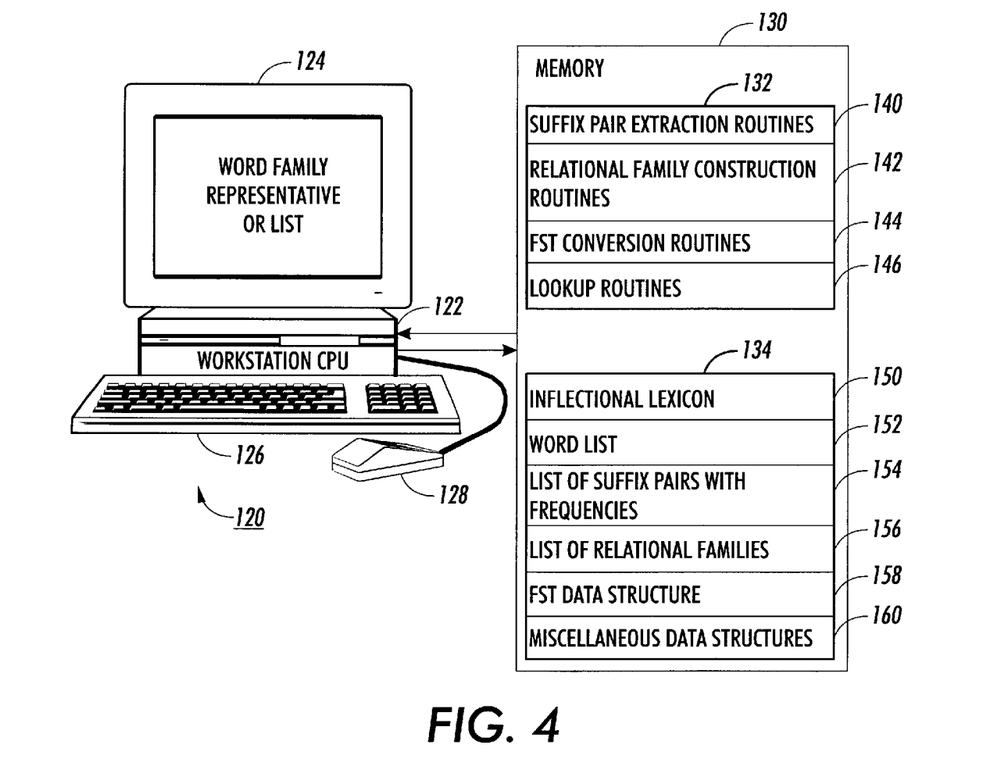
FIG. 4 is a schematic diagram of a system in which the general acts in FIG. 2 have been implemented.

In FIG. 4, system 120 includes the central processing unit (CPU) 122 of a Sun SPARC workstation, which is connected to display 124 for presenting images and to keyboard 126 and mouse 128 for providing signals from a user. CPU 122 is also connected so that it can access memory 130, which can illustratively include program memory 132 and data memory 134.

The routines stored in program memory 132 can be grouped into several functions—suffix pair extraction routines 140, relational family construction routines 142, FST conversion routines 144, and lookup routines 146. FIG. 4 also shows several data structures stored in data memory 134 and accessed by CPU 122 during execution of routines in program memory 132—inflectional lexicon 150; word list 152; list 154, listing suffix pairs with frequencies; list 156, listing relational families of words; FST data structure 158; and miscellaneous data structures 160. Inflectional lexicon 150 can be any appropriate lexicon for the language of the words in word list 152, such as Xerox lexicons for English or for French, both available from InXight Corporation, Palo Alto, Calif. Word list 152 can be any appropriate word list, such as the word lists that can be extracted from the Xerox lexicons for English or for French.

Figure 5:
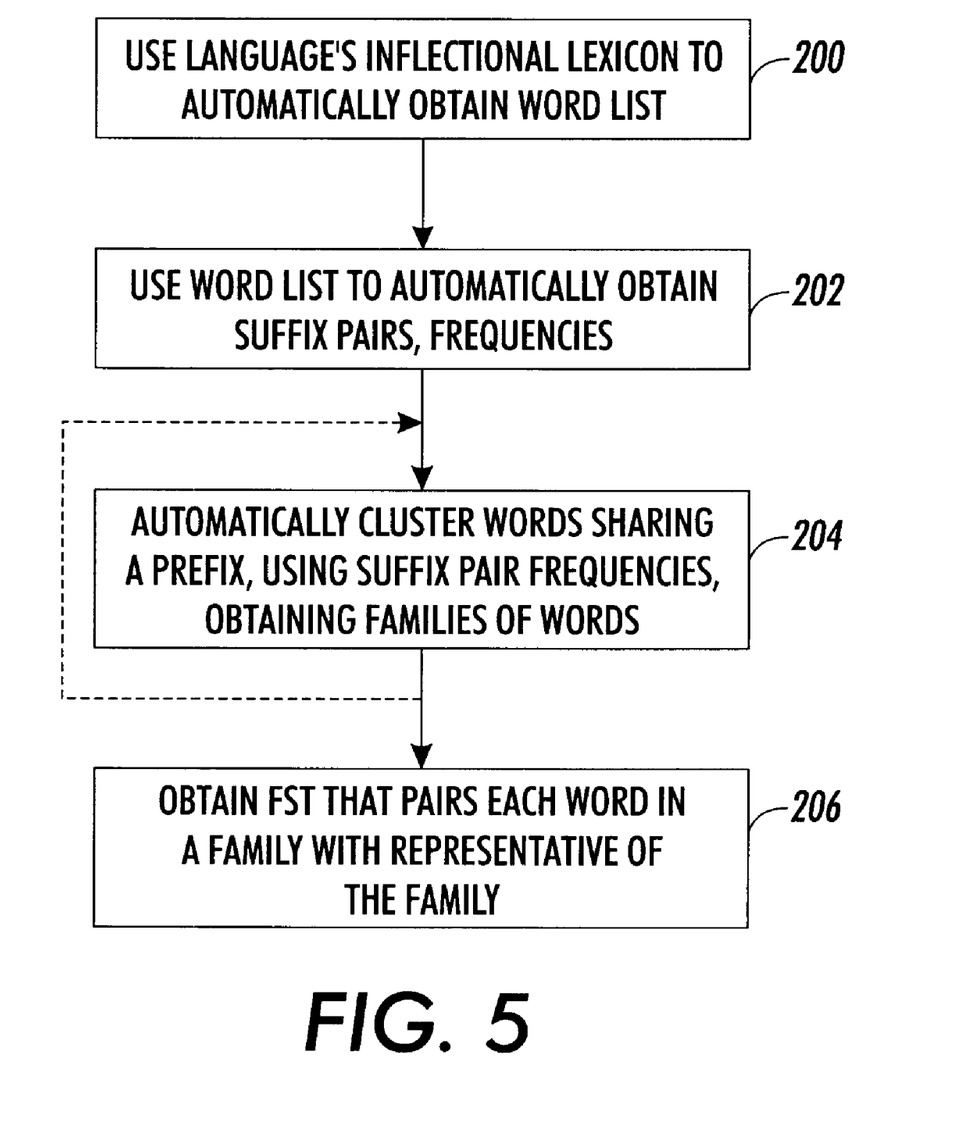
FIG. 5 is a flow chart showing how the system of FIG. 4 implements acts as in FIG. 2.

FIG. 5 illustrates high-level acts performed by processor 122 in executing some of the routines stored in program memory 132.

In executing suffix pair extraction routines 140, processor 122 uses inflectional lexicon 150 to automatically obtain word list 152, as shown in box 200. Then processor 122 uses word list 152 to automatically obtain list 154, which lists a set of suffix pairs and their frequencies, as shown in box 202.

The acts in boxes 200 and 202 are thus one way of implementing the act in box 30 in FIG. 2, and the act in box 200 is optional because a word list could be obtained in other ways. The suffix pairs can be viewed as strings for making a transition between pairs of related words in the word list, with one suffix being a string that is removed from one word in the pair to obtain a prefix and the other suffix being a string that is then added to the prefix, after any appropriate modifications in the prefix, to obtain the other word in the pair.

In executing relational family construction routines 142, processor 122 then automatically clusters a set of words from word list 152 using the suffix pair frequencies from list 154, as shown in box 204. The set of words can, for example, share a prefix. The result is list 156, which lists a set of word families, each of which is a subset of the words clustered in box 204. As suggested by the dashed line in FIG. 5, the act in box 204 can be repeated for each of a number of sets of words; each set can, for example, include words that share a specific substring. The act in box 204 is thus one way of implementing the act in box 32 in FIG. 2. The word families obtained in this manner are referred to as "relational families" to distinguish them from conventional derivational families, which they resemble.

In executing FST conversion routines 144, processor 122 obtains FST data structure 158 that provides an input-output pairing between each of the words in a family and a representative of the family, as shown in box 206. A family's representative could, for example, be its shortest word. The act in box 206 is optional, and, like the acts in boxes 200, 202, and 204, can be performed automatically.

In executing lookup routines 146, processor 122 can provide input words to FST data structure 158 to obtained desired output, such as a word family representative or a list of the words in a family. The input words can be received from keyboard 126 or can be indicated by a selection from mouse 128, and the output can be presented on display 124 as shown. For example, FST data structure 158 can respond to an input word by providing as output the representative of a relational family from box 204 that includes the input word. Conversely, FST data structure 158 can respond to the representative of a relational family by providing as output all the words in the relational family. The FST thus facilitates rapid lookup of a representative of each relational family or of the words of a relational family.

The implementation in FIGS. 4 and 5 is thus based on two intuitive premises: First, it should be possible to automatically extract a set of suffixes from a language's inflectional lexicon. Second, it should be possible to automatically obtain information from a language's inflectional lexicon about relationships between suffixes that correspond to relationships between families of words.

C.2. Suffix Pair Extraction

Figure 6:
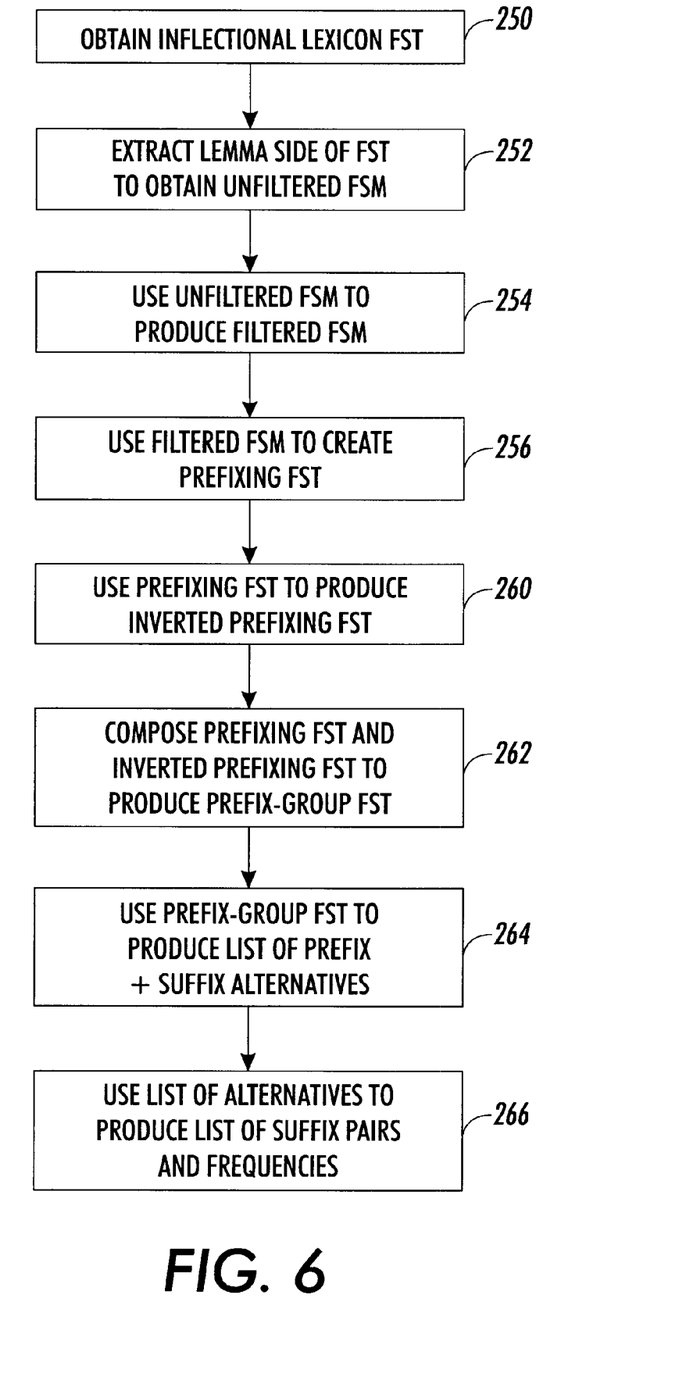
FIG. 6 is a flow chart showing in greater detail how suffix pairs are obtained in FIG. 5.

FIG. 6 illustrates in more detail how the acts in boxes 200 and 202 in FIG. 5 can be implemented.

The intuitive premise behind suffix extraction as in FIG. 6 is that long words of a given language tend to be obtained through derivation, and more precisely through addition of suffixes, and thus long words can be used to identify regular suffixes.

It is helpful to think of two words w1 and w2 of a given language as being p-similar if and only if two conditions are met: Their first p characters of both w1 and w2 are the same and the (p+1)th characters of w1 and w2 are not the same. The character strings s1 and s2 that begin with the (p+1)th characters of w1 and w2 respectively can be referred to as pseudo-suffixes, and either or both s1 and s2 can be the empty string-both can be empty if w1 and w2 differ only in their part of speech. The pair (s1, s2) can be referred to as a pseudo-suffix pair that links w1 and w2.

The notion of p-similarity can be understood from examples: The English words "deplorable" and "deploringly" are 6-similar, with (able, ingly) an English pseudo-suffix pair that links them. Since "deplorable" is an adjective and "deploringly" is an adverb, the pseudo-suffix pair can be more precisely written (able+AJ, ingly+AV), where +AJ stands for adjective and +AV for adverb; this means that a transition from an adjective to an adverb can be made by removing the string "able" and adding the string "ingly", or vice versa.

The notion of p-similarity can be generalized to the broader notion of p/q-equivalence where two words w1 and w2 of a given language set are p/q-equivalent if the following conditions are met: The first p characters of w1 and the first q characters of w2 are equivalent and the (p+1)th character of w1 is not equivalent to the (q+1)th character of w2. Under this definition, p-similarity is a special case of p/q-equivalence in which p=q and the first p characters of w1 are identical to the first p characters of w2. Where w1 and w2 are p/q-equivalent, the character strings s1 and s2 that begin with the (p+1)th character of w1 and the (q+1)th character of w2 respectively can be referred to as pseudo-suffixes, as described above in relation to p-similarity.

Ideally, the implementation in FIG. 6 would return only those pseudo-suffix pairs that are valid, where a pair is valid if and only if it includes two actual suffixes of the language that describe the transition between two words in a derivational family of words in the language. In practice, however, an automatic technique can only approximate this ideal. The implementation in FIG. 6 uses p/q-equivalence and the number of occurrences of a pseudo-suffix pair to reduce the number of invalid pairs it returns.

As p/q-equivalence (or p-similarity) of two words increases, the probability increases that their pseudo-suffix is valid. For the 2-similar English words "divide" and "differ" have a pseudo-suffix pair (vide+V, ffer+V), where +V stands for verb. But this pair is invalid, because neither "vide" nor "ffer" is an actual suffix of English, and also because "divide" and "differ" do not belong to the same derivational family. On the other hand, any pair of 10-similar English words is very likely to have a valid pseudo-suffix pair because the pseudo-suffixes are likely to be actual suffixes and the words are likely to belong to the same derivational family. But accepting only pseudo-suffix pairs from 10-similar words will eliminate many valid pseudo-suffix pairs that only occur with shorter prefixes.

The implementation of FIG. 6 accepts a pseudo-suffix pair only if the pair can be obtained from a pair of words that are at least 5/5-equivalent. This level of p/q-equivalence represents a good tradeoff between the increased likelihood that a pair will be valid if obtained from words that have high p/q-equivalence and the risk of screening out valid pairs obtained from words with lower p/q-equivalence. Experience suggests that a slight change in p/q-equivalence (or p-similarity) will not significantly change the resulting set of pseudo-suffix pairs.

Similarly, as the number of occurrences of a pseudo-suffix pair increases, the probability increases that the pseudo-suffix pair is valid. A pair that occurs only once or a few times may relate to an irregular phenomenon or be invalid. The implementation of FIG. 6 accepts a pseudo-suffix pair only if the pair occurs with at least two different prefix sets, where the prefixes in each set are p/q-equivalent. This minimal value is sufficient to screen out a large number of invalid pairs, but remains quite loose so that the same implementation can be applied to a variety of different languages.

This parameter can be better understood by considering exemplary French suffix pairs extracted from a French inflectional lexicon, each with its number of occurrences:

ation+N: er+V/782
+AJ: ment+AV/460
eur+AJ: ion+N/380
er+V: on+N/50
sation+N: tarisme+N/5

All of these pairs are valid except the last, which occurs, for example, in "autorisation—autoritarisme" (authorisation—authoritarianism). These pairs also show that a valid pseudo-suffix pair does not always link words in the same derivational family. For example, the pair (er+V, on+V) yields a link between "saler" and "salon" (in English, salt and lounge), even though the two words refer to different concepts. Validity only requires that a pseudo-suffix pair relates two words that are in the same derivational family, a criterion which is met by the pair (er+V, on+V) because it relates, for example, "friser" and "frison" (in English, curl (+V) and curl (+N)).

As shown in FIG. 6, the implementation begins in box 250 by obtaining an inflectional lexicon FST data structure, such as the Xerox inflectional lexicons for English and French available from InXight Corporation of Palo Alto, Calif. These lexicons conclude each acceptable character string with a part-of-speech (POS) tag. The act in box 250 can include obtaining a handle to access a lexicon that is already stored in memory, as illustrated by inflectional lexicon 150 in FIG. 4.

The act in box 252 extracts the non-inflected or lemma side of the FST data structure to obtain an unfiltered FSM data structure that accepts all character+POS strings that are acceptable to the lemma side of the FST data structure. Because the FST data structure typically accepts an infinite set of character+POS strings, including strings of numbers, the unfiltered FSM data structure typically also accepts an infinite set, although it could be finite if the FST only accepts a finite set of character+POS strings. The act in box 252 can be implemented with a conventional automatic FSM extraction utility. Ways to implement this and related operations can be understood from U.S. Pat. No. 5,625,554 and Kaplan, R.M., and Kay, M., "Regular Models of Phonological Rule Systems", *Computational Linguistics*, Vol. 20, No. 3, 1994, pp. 331–380 ("the Kaplan and Kay article").

The act in box 254 then filters the unfiltered FSM data structure from box 252 to produce a filtered FSM data structure that accepts only suitable character+POS strings, thus producing word list 152 in FIG. 4. For example, character strings can be filtered out that end with inappropriate POS tags, such as POS tags that indicate numbers of various kinds or that indicate other types of character strings that are inappropriate. In languages in which words can be created by concatenation, such as German, character strings may be filtered out that exceed a maximum appropriate length or a maximum appropriate number of concatenated parts, such as four. The act in box 254 can be implemented by composing the unfiltered FSM with a filtering FSM that defines the conditions for including a character string in the filtered FSM. The filtering FSM can be created using conventional techniques, similar to those described in U.S. Pat. No. 5,625,554 and the Kaplan and Kay article.

The act in box 256 then uses the filtered FSM data structure from box 254 to create a prefixing FST data structure that outputs a normalized prefix-equivalent in response to an acceptable word. In other words, the input level of the prefixing FST accepts all of the character+POS strings accepted by the filtered FSM, and the output level provides, for each input character+POS string, a normalized p-character string that is p/q-equivalent to a prefix of the input character+POS string for some value of q.

The act in box 256 can be implemented by creating an intermediate FST that responds to a character string by automatically normalizing characters until a string of p normalized characters is obtained; normalizing can include, for example, removing diacritical marks and possibly making replacements of characters and other modifications that produce equivalent prefixes. In the current implementation, each normalizing operation replaces a character with another character, thus maintaining one-to-one or p/p-equivalence between characters; the implementation could readily be extended to normalize a doubled character as a single character or vice versa or to make other normalizations that change the number of characters.

The intermediate FST can then be run on the word list indicated by the filtered FSM to produce a prefix FSM that indicates all the prefix-equivalents. The prefix FSM can be composed with the filtered FSM to produce the prefixing FST. In the prefixing FST, the (p+1)th and following characters along each path at the input level are paired with an epsilon at the output level, meaning that no output is provided in response to those characters.

The act in box 260 inverts the prefixing FST from box 256 to produce an inverted prefixing FST with prefix equivalents at the input level and with acceptable words at the output level. The act in box 260 can be implemented by simply switching the elements in the label of each transition in the FST.

The act in box 262 composes the prefixing FST from box 256 with the inverted prefixing FST from box 260, performing the composition so that the prefix-equivalents drop out and so that epsilons are added to lengthen the shorter of an input character+POS string to equal an output character+POS string, producing a prefix-group FST. The prefix-group FST accepts the word list of the filtered FSM from box 254 at its input level and can output every word that had the same prefix-equivalent in the prefixing FST from box 256. The composition in box 262 can be performed with conventional techniques similar to those described in U.S. Pat. No. 5,625,554 and the Kaplan and Kay article.

The act in box 264 then uses the prefix-group FST from box 262 to produce a list of prefix+suffix alternatives. The act in box 264 can be implemented by reading out the character pairs along each path of the prefix-group FST and comparing the characters in each pair until a mismatch is found. Before finding a mismatch, only one character is saved for the prefix, but after a mismatch is found, both characters of each pair are saved for the suffix.

For example, for the path that relates the verb "produce" to the noun "production", the prefix+suffix alternatives could be represented by the following string: (p, r, o, d, u, c, <e:t>, <+V:i>, <ε:o>, <ε:n>, <ε:+N>), where "ε" characters have been included to compensate for the difference in length, and where "+V" and "+N" indicate a verb and a noun, respectively. The prefix of the path is thus "produc", and the path has two alternative suffixes, "e+V" and "tion+N".

The list produced in box 264 thus implicitly detects the p-similarity each pair of related words. In addition, the list can be produced in such a way that it is alphabetized, so that larger groups of p-similar words are adjacent within the list. As a result, the list can readily be used to produce pseudo-families of p-similar words, which can then be used as described below in relation to FIG. 7.

The act in box 266 can then use the list produced in box 264 to produce list 154 of suffix pairs and frequencies. List 154 can be produced by converting the suffix alternatives of each item on the list from box 264 to a suffix pair. If the suffix pair matches a suffix pair on a list of previously obtained suffix pairs, the act in box 266 increments its frequency; if not, the suffix pair is added to the list with a frequency of one. Because the automatically obtained suffix pairs in list 154 may not all include valid suffixes of a natural language set, they are referred to below as "pseudo-suffix pairs".

C.3. Word Family Construction

Figure 7:
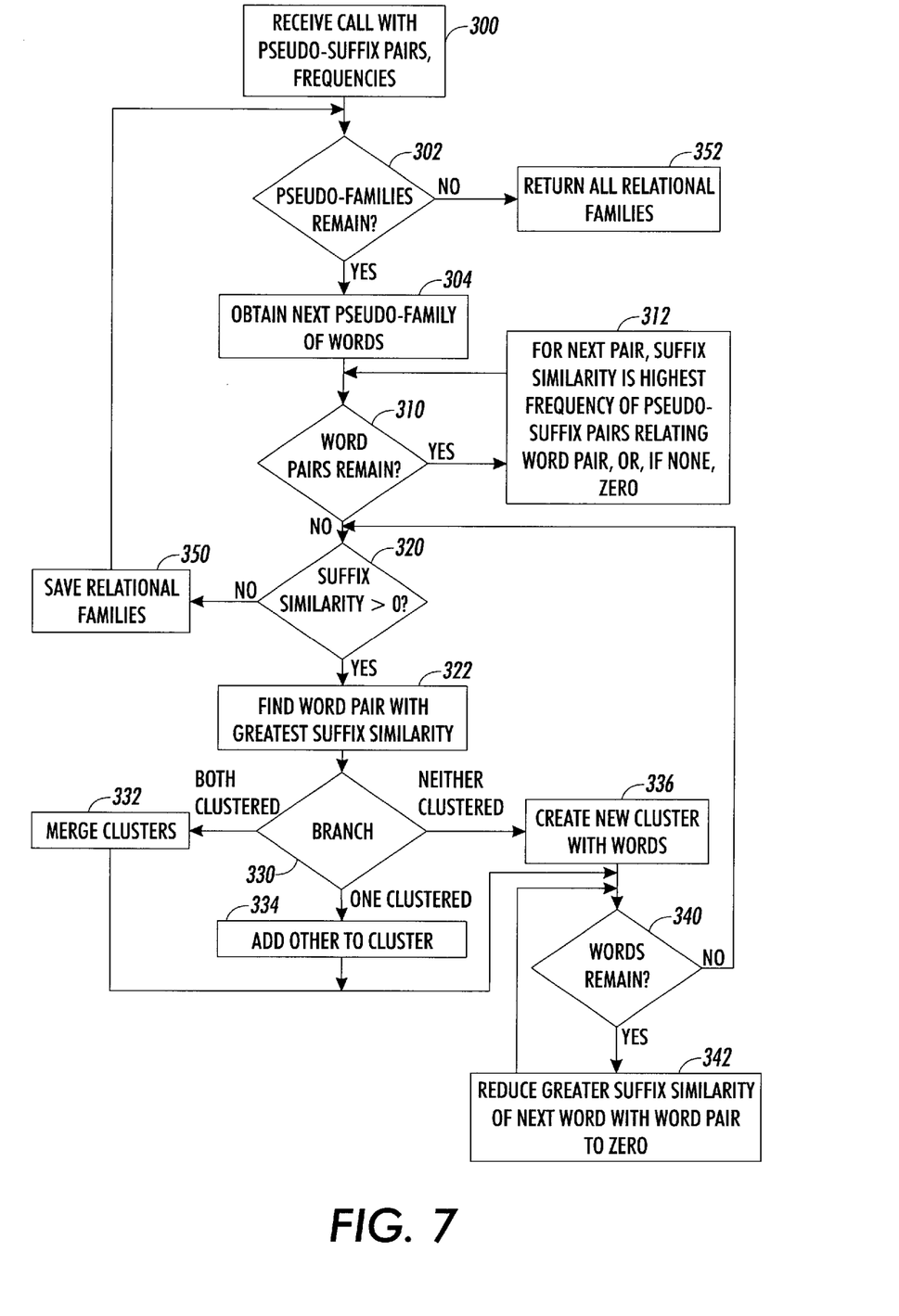
FIG. 7 is a flow chart showing in greater detail how words are clustered in FIG. 5.

FIG. 7 illustrates in more detail how the act in box 204 in FIG. 5 can be implemented.

Word family construction as in FIG. 7 addresses the problem of automatically grouping all the words together that belong to the same derivational family without grouping words together that belong to different derivational families. Simple approaches that have been proposed typically do not overcome this problem.

One simple approach is to add words to a family that have some level of p-similarity with words in the family and that relate to words in the family through suffix pairs. For example, given the two English suffix pairs (+V, able+AJ) and (+V, ment+N), we can first group the 6-similar words "deploy" and "deployable", and then add to this family the word "deployment". But this approach will also group "depart" and "department" into the same family.

In general, then, suffix pairs relate words that do not belong to the same derivational family. This problem is general to any stemming procedure, as illustrated by the English string "ment" at the end of a word, which may or may not correspond be a suffix. This phenomenon is frequently cited by opponents of fully automatic stemming procedures, and it is typically overcome with a list of exceptions, including exceptions to control removal of the suffix "ment".

The intuitive premise behind word family construction as in FIG. 7 is that suffixes form families, and that the use of a suffix usually coincides with the use of other suffixes in the same family, while suffixes from different families do not co-occur. For example, if the string "ment" is not a suffix, as in "department", then it is likely that the word obtained after removal of the string, i.e. "depart", will support suffixes that do not usually co-occur with "ment", such as "ure" which produces "departure". This premise is supported by the manually created suffix families disclosed in the Debili thesis, discussed above.

To automatically construct relational families of words based on families of suffixes, the implementation of FIG. 7 uses a hierarchical agglomerative clustering approach, allowing an element to be added to a cluster in accordance with a similarity measure. Specifically, FIG. 7 illustrates a complete link approach of the type disclosed by Rasmussen, E., "Clustering Algorithms", in Frakes, W.B. and Baeza-Yates, R., eds., *Information Retrieval-Data Structures and Algorithms*, Prentice Hall, Englewood Cliffs, N.J., 1992, pp. 419–436. The complete link approach takes into account the relation between an element and all the elements that are already in the cluster to which it may be added. The similarity measure used is a measure of suffix similarity which is initially based on a frequency from box 202.

Suffix similarity alone, however, is not sufficient to relate two words. For example, the suffix pair (able+AJ, ingly+AV) would, without more, relate the words "enjoyable" and "deploringly", which are unrelated. Therefore, the implementation of FIG. 7 also uses prefix criteria to determine whether words should be grouped together.

A first prefix criterion is applied to obtain pseudo-families of words that have an appropriately chosen level of similarity or equivalency. It has been found that 3-similarity or 3/q-equivalency are appropriate criteria to obtain pseudo-families of words for languages such as English and French, and appear to preserve valid relations between words while being language independent.

An extract of an exemplary 3-similar English pseudo-family includes the following words: deployability, deployable, deploy, deployer, department, departer, depart, departmental, deprecate, deprecation, deprive, depriver, deplore, deplorable, deploringly.

A second prefix criterion is applied implicitly in finding pairs of words that are related by suffix pairs. In other words, a pair of words are only related by a suffix pair if removing one of the suffixes from one of the words, obtaining one or more equivalents of the remaining prefix, and replacing the removed suffix with the other suffix on one of the equivalents produces the other word, which can only be true if the prefix that precedes the suffix in one word is equivalent to the prefix that precedes the suffix in the other word.

The implementation of FIG. 7 begins in box 300 when a call is received to perform clustering on a set of words such as word list 152 using a set of pseudo-suffix pairs and their frequencies such as list 154, which can be obtained as in FIG. 6. Before proceeding further, the implementation could obtain all of the 3-similar or 3/q-equivalent pseudo-families in the set of words, or each pseudo-family can be obtained as it is needed.

The act in box 302 begins an outer iterative loop that handles each of the pseudo-families in turn. The act in box 304 obtains the next pseudo-family, such as by accessing a previously obtained pseudo-family or by obtaining one anew.

Then the act in box 310 begins a first inner iterative loop that handles each word pair that can be obtained from the pseudo-family. In box 312, each iteration of the loop sets the suffix-similarity of a word pair. The suffix similarity is the highest frequency of the pseudo-suffix pairs received in box 300 that relate the two words, whether with identical prefixes or acceptable equivalent prefixes. If none of the pseudo-suffix pairs relate the two words, the suffix similarity is zero.

The act in box 320 begins a second inner iterative loop that handles each word pair with a suffix similarity greater than zero, continuing until the test in box 320 determines that none of the word pairs have a suffix similarity greater than zero. The act in box 322 begins each iteration by finding the pair of words that are related by a suffix pair with the greatest suffix similarity. The iteration then branches in box 330 based on previous clustering, if any.

If both words of the pair have already been clustered, the two clusters that include them are merged, in box 332. If one of the words has been clustered and the other has not, the non-clustered word is added to the cluster that includes the other word, in box 334. And if neither of the words has been clustered, a new cluster is created that includes both of them, in box 336.

Each iteration also includes adjustment of suffix similarities of other words with respect to the words of the pair found in box 322. As shown in box 340, this is done for every word. In box 342, the greater of a word's suffix similarities with the words of the pair is reduced to zero. This ensures that the word will only be added to the cluster that includes the words of the pair if the lesser suffix similarity is relatively large, thus enforcing the complete link approach.

When all the suffix similarities reach zero for one of the pseudo-families, the act in box 350 saves each cluster as a relational family, and also saves each unclustered word in a respective one-word relational family. The following, separated by lines of asterisks, are exemplary clusters obtained from the English pseudo-family of 3-similar words beginning with dep:
*****
depletability depletable depletableness depletably deplete depleter depletion
*****
deployability deployable deployableness deployably deploy deployer deployment
*****
depressant depress depresser depressingly depression depressor depressive depressiveness
*****
depressively
*****
deprecate deprecation deprecator deprecative deprecativeness deprecatively deprecativity
deprecatorily deprecatory deprecatingly
*****
deposability deposable deposableness deposably depose deposer deposal
*****
department departmentality departmental departmentalness departmentally
*****
depart departure departer
*****

When relational families have been obtained for all the pseudo-families, the act in box 352 returns all the relational families from all the pseudo-families, such as in the form of list 156 in FIG. 4.

C.4. Conversion to FST

In the current implementation, a representative word can be automatically chosen for each relational family returned in box 352. The representative word can be the shortest word in the family or, if more than one word has the shortest length, an arbitrarily chosen word with the shortest length, such as the verb, or a randomly chosen verb if more than one verb has the shortest length. Or the representative could be the first word of the shortest length words in alphabetical order.

All the relational families of a language can then be automatically converted into a finite state transducer (FST) of the type disclosed in U.S. Pat. No. 5,625,554. Each transition of the FST can have two levels, a first of which indicates a character of a word and a second of which indicates a character of the representative of the family that includes the word. Such an FST can be produced using techniques similar to those disclosed in Karttunen, L., "Constructing Lexical Transducers", *Proceedings of the 15th International Conference on Computational Linguistics, Coling* 94, Aug. 5–9, 1994, Kyoto, Japan, Vol. 1, pp. 406–411.

C.5. Lookup

The FST produced as described above can be used in various ways, some of which are similar to techniques described in U.S. Pat. No. 5,625,554. For example, it can be accessed with the characters of a word to obtain a representative of the relational family that includes the word. Or it can be accessed with the representative of a relational family to obtain the words in the family. Or both of these techniques can be performed in sequence to use a word to obtain the words in its family.

The FST can also be used to obtain a representative of a relational family that is likely to relate to an unknown word, using the techniques disclosed in copending, coassigned U.S. patent application No. 09/XXX,XXX, entitled "Identifying a Group of Words Using Modified Query Words Obtained from Successive Suffix Relationships", incorporated herein by reference.

C.6. Results

An FST for English words produced as described above has been compared with the derivational lexicon described in Xerox Corporation, *Xerox Linguistic Database Reference* (English Version 1.1.4 ed.), 1994 ("the Xerox Database"), considered to be a very high quality derivational lexicon. Initially, derivational families were extracted from the Xerox Database and compared to the relational families in the FST. The comparison was based on the number of words which would have to be moved in or out of a relational family to obtain a counterpart derivational family. Due to overstemming errors, in which unrelated words are in the same relational family, and understemming errors, in which related words are in different relational families, there are often differences between the relational and derivational families.

Counterpart relational and derivational families were identified by assuming that a word wi is correctly placed in a relational family ri if the relational family includes most of the words of the derivational family of wi and the derivational family of wi includes most of the words of the relational family ri. In other words, a relational family and derivational family are counterparts only if they are mostly the same. Words that are not in both counterparts must be moved to make the relational and derivational families the same, and the ratio of words that need not be moved, summed over all the derivational families, to the total number of words in all the derivational families is a distance measure between the two sets of families.

As a preliminary test, relational families were obtained from the Xerox inflectional lexicon for English using three different hierarchical agglomerative clustering techniques— the complete link technique described above; a single link technique that makes no use of suffix family but rather adds an element to a cluster whenever a link, as detected in box 322 in FIG. 7, exists between the element and one of the elements of the cluster; and a group average technique that makes partial use of the notion of suffix family by adding an element to a cluster on the basis of the average link between the element and the elements of the cluster, where the average link can be obtained from the suffix similarities obtained in box 312 in FIG. 7. When the three sets of relational families were compared with the derivational families from the Xerox Database in the manner described above, the following ratios were obtained: single link relational families—0.47; group average relational families— 0.77; and complete link relational families—0.835. These results confirm that the notion of suffix families is effective, and validate the use of the complete link technique.

The relational families obtained with the complete link technique were also compared with two well-known English stemmers—the SMART stemmer disclosed in Salton, G., and McGill, M.J., *Introduction to Modem Information Retrieval*, New York: McGraw-Hill, 1983, pp. 130—136 and the stemmer described in Porter, M.F., "An algorithm for suffix stripping", *Program*, Vol. 14, no. 3, July 1980, pp. 130–137. The SMART stemmer, which includes a set of rules with conditions of applications, was first implemented twenty-five years ago and has undergone much manual revision by generations of information retrieval researchers. Porter's stemmer, currently the most used stemmer, is compact, with only 60 different suffixes, and is easy to implement even though it performs nearly as well as other, more complex stemmers.

The comparison with the SMART stemmer and Porter's stemmer was done by first constructing families with each stemmer and then comparing the constructed families with the derivational families from the Xerox Database in the manner described above. The families were constructed by submitting the whole lemmatized lexicon of the Xerox Database to each stemmer and grouping words that share the same stem. The following ratios were obtained: SMART stemmer—0.82; Porter's stemmer—0.65.

These results indicate that the SMART stemmer performs better than Porter's stemmer, but that the relational families from the complete link technique perform at least as well as the SMART stemmer and better than Porter's stemmer. In other words, the technique described above can produce relational families closer to actual derivational families than the families constructed from the two stemmers. This strength of the technique apparently results from its ability to distinguish between groups that may not be distinguished by exceptions in the SMART stemmer and Porter's stemmer. The example above, in which the technique can distinguish the relational family of "depart" from the relational family of "department", is apparently representative of a number of similar cases that are not covered by exceptions in the stemmers. Another advantage of the implementation described above is that the representative of each relational family is always an acceptable word.

An FST for French words produced as described above from the Xerox inflectional lexicon for French has also been tested, though without the benefit of a French derivational lexicon comparable to the Xerox Database. The test was made in the framework of an information retrieval task, an environment in which differences between stemmers tend to be smoothed. The aim of the test was to determine whether the FST could increase the performance of an information retrieval system operating in French.

The test used the data, i.e. document set, topic set, and relevance judgment set, provided within the AMARYLLIS project, described in Coret, A., Kremer, P., Landi, B., Schibler, D., Schmitt, L., and Viscogliosi, N., "Accès à l'information textuelle en francais: Le cycle exploratoire Amaryllis", 1$^e$res *JST* 1997 *FRANCIL de l'AUPELF-UREF,* 15–16 *avril* 1997, Avignon, France, pp. 5–8, a project that evaluates information retrieval systems on French data. The test ran three different indexing schemes—the first with no treatment and considering words as index; the second replacing each word with its lemma from the Xerox inflectional lexicon; and the third replacing each word with the representative of its relational family from the FST. The average precision increased over the first scheme by approximately 16.5% with the second scheme and by approximately 18% with the third scheme.

C.7. Variations

The implementations described above could be varied in many ways within the scope of the invention.

The implementations described above have been successfully executed on Sun SPARC workstations, but implementations could be executed on other machines.

The implementations described above have been successfully executed using the C programming environment on the Sun OS platform, but other programming environments and platforms could be used.

The implementations described above perform clustering over relation values that are suffix similarities measured by frequency of occurrence of pseudo-suffix pairs. The invention could be implemented to perform clustering over any other automatically obtained relation value, whether a distance, a similarity or dissimilarity coefficient, or any other appropriate value, such as mutual information. Further, a relation value used in automatic clustering could indicate a relation between more than two pseudo-suffixes.

The implementations described above include parts of speech in each pseudo-suffix pair, but this is optional. The invention could be implemented without taking part of speech into account.

The implementations described above use a language's inflectional lexicon to obtain relational families of words, but other information about a language could be used to obtain relational families, such as a list or other data structure indicating words that are acceptable in the language.

The implementations described above use various clustering techniques, including the complete link technique, the group average technique, and the single link technique, to produce mutually exclusive clusters. Other clustering techniques could be used within the scope of the invention, including double link and other n-link clustering and also including techniques in which a word can be within more than one cluster.

The implementations described above perform clustering on 3-similar pseudo-families obtained from a set of words, but clustering could be performed on the entire word set or on pseudo-families meeting other criteria.

The implementations described above yield an FST converted directly from automatically obtained relational families, but automatically obtained relational families in accordance with the invention could also be manually "cleaned" or modified to obtain higher quality derivational families more rapidly than would be possible with manual techniques. Further, converting groups of words obtained in accordance with the invention into another form is optional, and groups of words could be stored in many other types of data structures in addition to an FST, such as in relational databases.

Also, additional types of information about automatically obtained relational families of words could be obtained and used in various ways. For example, for each relational family, a data structure such as a tree that summarizes the suffix relations within the family could be automatically obtained. For the relational family {deploy, deployment, deployer, deployable, deployability}, the top level of such a tree could be (Verb), with a link that adds the suffix "-ment" to obtain a (Noun) child, with a link that adds the suffix "-er" to obtain another (Noun) child, and with a link that adds the suffix "-able" to obtain an (Adjective) child; the (Adjective) child could, in turn, have a link that adds the suffix "-ity" to change "able" to "ability" to obtain a (Noun) grandchild. The resulting tree should approximate the ideal derivational tree joining the words of a derivational family, thus providing access to potential suffixes of a language, their morphotactics, and their paradigmatic use. Frequencies of occurrence of the trees can also be obtained, and more probable suffix relation trees can thus be identified.

To develop a derivational lexicon from relational families, a lexicographer could view the results obtained in this manner, review the automatically identified derivational processes implicit in the results for validity, make modifications in accordance with the actual derivational processes of a language, and generate a resulting set of modified relational families for further study and possible use. Modified relational families obtained in this way may provide a better approximation to derivational families than automatically obtained relational families. A lexicographer might therefore be able to develop a derivational lexicon more quickly without sacrificing accuracy, because the lexicographer can focus on irregularities of the language under consideration.

The implementations described above use an FST that maps from a word to a representative that is a shortest length word in the same relational family and from a representative to a list of words in the family. An FST could, however, map to any other appropriate representative of a family, such as an extracted root or even a number or other value that serves as an index.

The implementations described above employ relations between suffixes and do not take relationships between prefixes into account in grouping words, but relationships between prefixes could be taken into account by removing certain prefixes before grouping words and might be taken into account in other ways.

The implementations described above have been applied to English and French, and values of parameters such as p-similarity and p/q equivalence, although chosen for generality, have only been successfully used with English and French. The invention can be applied to languages other than English and French and values of parameters could be modified as necessary for greater generality or for optimal results with any specific language.

In the implementations described above, acts are performed in an order that could be modified in many cases.

The implementations described above use currently available computing techniques, but could readily be modified to use newly discovered computing techniques as they become available.

D. Applications

The invention can be applied to automatically produce an approximation of a derivational lexicon. The result, referred to herein as a "relational lexicon", can then be used as a derivational lexicon would be used. For example, from an input word, the relational lexicon can obtain another word that represents a group or family of related words, a process sometimes referred to as "stemming", "normalization", or "lemmatization". Unlike an inflectional lexicon, the relational lexicon can stem, normalize, or lemmatize across parts of speech. To improve information retrieval performance, this can be done in advance for each word in a database being searched and, at the time of search, for each word in a query. A search can then be performed by comparing the representative words, to find items in the database that relate to the query.

The relational lexicon can also be used to generate a group or family of words from one of the words in the group or family.

By analogy to an inflectional lexicon, the relational lexicon can also be used to go from one part of speech to another within a derivational family, a useful capability in application areas such as machine translation. For example, if two languages have counterpart multi-word expressions in which a word or subexpression in a first language has a different part of speech than the counterpart word or subexpression in a second language, translation could be accomplished by first obtaining a counterpart word or subexpression in the second language that has the same part of speech as the word or subexpression in the first language. Then, the relational lexicon could be used to derive the counterpart word or subexpression in the second language that has the appropriate part of speech.

The relational lexicon can also be used as part of a terminology extractor from monolingual and multilingual points of view, such as to extract indexes from a text for accessing a thesaurus or to perform other types of controlled indexing.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of grouping a set of words that may occur in a natural language set, comprising:
   automatically obtaining suffix relation data indicating a relation value for each of a set of relationships between suffixes that occur in the natural language set; and
   automatically clustering the words in the set of words using the relation values from the suffix relation data, to obtain group data indicating groups of words; two or more words in a group having suffixes as in one of the relationships and, preceding the suffixes, equivalent substrings.

2. The method of claim 1 in which the relation value for a relationship is its frequency of occurrence.

3. The method of claim 1 in which the relationships between suffixes are pairwise relationships.

4. The method of claim 3 in which the relation value of each pairwise relationship is the number of pairs of words that are related to each other by the pair of suffixes in the relationship.

5. The method of claim 3 in which the act of automatically clustering the words comprises:
   obtaining, for each of a set of pairs of words, a pairwise similarity value based on the relation value of a suffix pair, if any, that relates the words to each other; and
   performing automatic clustering using the pairwise similarity values for the pairs of words.

6. The method of claim 5 in which the act of performing automatic clustering performs complete link clustering.

7. The method of claim 5 in which the pairwise similarity value for a pair of words is equal to the greatest relation value of the relationships between suffixes that relate the words in the pair to each other.

8. The method of claim 3 in which the natural language set includes one natural language and the act of automatically obtaining suffix relation data comprises:
   using a lexicon for the language to obtain a word list indicating the set of words;
   using the word list to obtain suffix pair data indicating pairs of suffixes that relate words in the set of words to each other; and
   for each pair of suffixes indicated by the suffix pair data, obtaining a relation value indicating a number of times the suffix pair occurs in the set of words.

9. The method of claim 8 in which the lexicon is an inflectional lexicon for the language.

10. The method of claim 8 in which the suffix pair data further indicate, for each suffix in a pair, a part of speech; the relation value indicating the number of times the suffixes in the suffix pair occur in the set of words with the indicated parts of speech.

11. The method of claim 1, further comprising:
    automatically obtaining, for each group of words indicated by the group data, a representative; and
    automatically producing a data structure that can be accessed with a word in a group to obtain the group's representative.

12. The method of claim 11 in which the act of automatically obtaining a representative selects the shortest word in a group as the representative.

13. The method of claim 11 in which the data structure can also be accessed with a group's representative to obtain a list of words in the group.

14. The method of claim 11 in which the data structure is a finite state transducer data structure.

15. A system for grouping a set of words that occur in a natural language, comprising:
    memory for storing data; and
    a processor connected for accessing the memory; the processor operating to:
      automatically obtain suffix relation data indicating a relation value for each of a set of relationships between suffixes that occur in the natural language; the processor storing the suffix relation data in memory; and
      automatically cluster the words in the set using the relation values from the suffix relation data, to obtain group data indicating groups of words; two or more words in a group having suffixes as in one of the relationships and, preceding the suffixes, equivalent substrings; the processor storing the group data in memory.

16. The system of claim 15, further comprising:
    an inflectional lexicon stored in memory;
    the processor, in automatically obtaining suffix relation data, accessing the inflectional lexicon in memory.

17. The system of claim 15 in which the processor further operates to:
    automatically obtain, for each group of words indicated by the group data, a representative; and
    automatically produce a data structure that can be accessed with a word in a group to obtain the group's representative; the processor storing the data structure in memory.

18. The system of claim 17, further comprising a storage medium access device for accessing a storage medium; the processor being connected for providing data to the storage medium access device; the processor further operating to provide the data structure to the storage medium access device; the storage medium access device storing the data structure on the storage medium.

19. The system of claim 17, in which the processor is further connected for establishing connections with machines over a network; the processor operating to:

establish a connection to a machine over the network; and transfer the data structure to the machine over the network.

\* \* \* \* \*